Patented June 12, 1945

2,377,868

UNITED STATES PATENT OFFICE 2,377,868

SYNTHETIC COMPOSITIONS

Gaetano F. D'Alelio, Pittsfield, Mass., assignor to General Electric Company, a corporation of New York No Drawing. Application February 5, 1941, Serial No. 377,524

31 Claims. (Cl. 260—39)

This invention relates to the production of new and useful synthetic compositions. More particularly the invention is concerned with novel synthetic resins obtained by reaction of ingredients comprising an aminotriazine (amidogen triazine), for example melamine, an active methylene-containing body, for instance formaldehyde, methylol ureas, methylol melamines, etc., and an amino acid or a salt thereof or a mixture of an amino acid and a salt thereof. The aminotriazines (including iminotriazines) and the amino acids and salts thereof (including imino acids and salts thereof) used in carrying the present invention into effect have at least one hydrogen atom attached to an amino nitrogen and, therefore, can be caused to react with an active methylene-containing body.

This application is a continuation-in-part of my copending application Serial No. 256,998, filed February 17, 1939, and Serial No. 363,035, filed October 26, 1940, both of which applications are assigned to the same assignee as the present invention. In application Serial No. 256,998 I described the preparation of new reaction products of a mono- or poly-amide, an aldehyde and an aldehyde-reactable organic amphoteric substance free from polypeptide linkages, for example amino acids such as glycine, heterogeneous amino acids such as sulfamic acid and beta-aminoethyl sulfonic acid, etc. In copending application Serial No. 363,035 I disclosed and claimed aminoplasts modified with a specific amino acid, namely, sulfamic acid—more specific examples of such modified aminoplasts being condensation products of a mixture comprising formaldehyde, sulfamic acid and an aminotriazine or both a urea and an aminotriazine.

The amino acids used in carrying the present invention into effect are amphoteric substances and are not to be confused with the proteids and partially hydrolyzed proteids, examples of which are glycinin, zein, casein, legumin, gliadin and phaseolin, merely to mention a few. These proteid compounds are non-crystalloidal, water-insoluble bodies having polypeptide linkages and the colloidal properties of the high molecular weight proteins, as exemplified by viscosity and osmotic pressure phenomena. When the proteids or their alkali salts are plasticized, for example with water, alcohol, etc., or when they are caused to react with active methylene-containing bodies, in either case plastic compositions are obtained.

In contrast with the proteids the amino acids and their salts are crystalloids, or, if impure, may be obtained in crystalline form by simple recrystallization processes. They exhibit the properties typical of crystalloids, for example sharp melting or decomposition temperatures. In solution, the values of their freezing point depressions, boiling point elevations and osmotic pressures can be approximated by simple calculations.

The free amino acids represent the simplest aldehyde-reactable organic amphoteric substances having no polypeptide linkages that are known. Theoretically the simplest possible amino acid would be carbamic acid or amino formic acid, $NH_2COOH$, which, however, is not known to exist in a free state. Glycine or amino acetic acid, $NH_2CH_2COOH$, is the simplest amino acid known to exist in a free state.

It will be noted that such organic amphoteric substances as amino acids, of which glycine is one of numerous examples, contain both an acid group, —COOH, and a basic group, —$NH_2$. The amphoteric substances on ionization give simultaneously two ions, one negatively charged and the other positively charged, leaving a residual molecule with two equal and opposite charges.

It is known that free or uncombined amino acids (hereafter for brevity referred to merely as "amino acids"), for example amino carboxylic acids and amino sulfonic acids, can react with basic substances such as sodium and potassium carbonates and hydroxides, trimethyl amine, pyridine, morpholine, aniline, cyclohexyl amine, naphthyl amine, diethanol amine and the like to give the corresponding salts of the amino acid. These salts are basic not because of the added alkali, but because the —$NH_2$ group of the amino acid has been freed of the neutralizing effect of the —COOH group, this group being neutralized by the added base. Thus, sodium glycinate, $NH_2CH_2COONa$, is alkaline in its reactions. Similarly, the original —$NH_2$ group of the amino acid can be neutralized by adding acid, such as sulfuric, hydrochloric, acetic, benzoic and the like, resulting in acidic glycine salts. In these salts the —COOH group is free to ionize as an acid, since the influence of the —$NH_2$ group has been removed by the added acid. Thus, glycine hydrochloride, $HCl.NH_2CH_2COOH$, is acidic in nature.

It also is known that the amino acids can be caused to react with an aldehyde to form alkoylol derivatives. For example, when formaldehyde and glycine are condensed, acidic methylol glycine, $HOCH_2NHCH_2COOH$, is obtained. However, unless the amino nitrogen has at least one hydrogen atom attached directly thereto the amino acid will not condense with an aldehyde or other active methylene-containing body to form an alkylol derivaive. The amino acids and their salts used in carrying the present invention into effect in all cases contain either an unsubstituted —$NH_2$ group or a partly substituted amino group, that is, an amino group wherein one and only one of the amino hydrogens has been replaced by a substituent group. Another characteristic of the amphoteric amino acids is that they can be esterified.

It also has been suggested that amino acids suitable for use as textile assistants can be prepared by causing to react (1) an amide of a high molecular weight carboxylic or sulfonic acid containing at least eight carbon atoms and having at least one hydrogen atom directly connected to a nitrogen atom (e. g., the amides, monoalkyl amides, cycloalkyl amides and aryl amides of lauric, oleic or stearic acids), (2) formaldehyde or a formaldehyde-yielding substance and (3) a low molecular weight amino carboxylic or sulfonic acid having at least one hydrogen atom directly connected to a nitrogen atom (e. g., sarcosine, taurine, methyl taurine and 2-toluidine-5-sulfonic acid).

The present invention is based on my discovery that new and valuable synthetic materials can be produced by reaction of ingredients comprising essentially an amino-triazine (that is, an aminotriazine containing at least one active hydrogen atom in the molecule, specifically in an amino radical thereof), an active methylene-containing body and an amino acid or a salt thereof. Examples of amino acids that may be employed are the monoamino monocarboxylic acids, e. g., glycine, alanine, aline, norvaline, leucine, norleucine. isoleucine, valine, isovaline, phenylalanine, tyrosine, serine, alpha-aminobutyric acid, alpha-amino-beta-hydroxybutyric acid, cysteine, methionine, etc.; cystine; the monoamino-dicarboxylic acids, e. g., aspartic acid, glutamic acid, etc.; the diamino-monocarboxylic acids, e. g., arginine. lysine, ornithine, asparagine, citrulline, etc.; the heterocyclic amino acids, e. g., histidine, tryptophane, proline, oxyproline, hydrooxyproline, etc.; the heterogeneous amino acids, e. g., the ortho, meta and para amino benzoic acids, beta amino propionic acid, amino sulfonic acids as, for instance, sulfamic acid (sulfaminic acid), $NH_2SO_2OH$, 2-toluidine-5-sulfonic acid, beta-aminoethyl sulfonic acid, $NH_2CH_2CH_2SO_2OH$, etc. Salts of the amino acids just mentioned by way of illustration may be employed, for instance basic amino salts, e. g., the barium, calcium, strontium, sodium, potassium, lithium, caesium and rubidium salts, more particularly, the barium, calcium, strontium, sodium, potassium, lithium, caesium and rubidium sulfamates, which compounds, it will be noted, include sulfamates of the alkali metals and of the alkaline-earth metals, the ammonium salt, e. g., ammonium sulfamate, the organic ammonium salts, etc., and the acidic amino salts, e. g., salts obtained by reaction of amino acids with organic or inorganic acids such, for instance, as hydrochloric, sulfuric, nitric, hydrofluoric, carbonic, formic, acetic, chloracetic, dichloracetic, propionic, butyric, benzoic, phthalic, oxalic, malonic, succinic, adipic, maleic, fumaric, citraconic, acrylic, polyacrylic, methacrylic, polymethacrylic, atropic, etc. Mixtures of the above-mentioned amino acids and their salts also may be used. When salts are used I prefer to employ basic amino salts either alone or admixed with an amino acid, since the resulting resins and molding compositions produced from such resins have better time or storage stability characteristics than when acidic amino salts are employed.

As is well known, aminoplasts are synthetic resins derived from amino (including imino) or amido (including imido) compounds, a typical example being urea-formaldehyde resin (references: Modern Plastics, vol. 17, No. 2, October, 1939, page 433; Patents 2,142,840—Grosse, 2,142,860—Nowak, 2,142,861—Schuhmann, 2,157,883—Auerbach et al. and 2,214,851—D'Alelio). In the production of aminoplasts it has heretofore been common practice in converting such materials to the insoluble, infusible state to incorporate into the condensation product or into the molding composition a latent or an active (direct) curing catalyst. As pointed out more fully hereafter, this technique and the final products have not been entirely satisfactory.

My invention provides potentially reactive (heat-convertible) aminoplasts and molding compositions of the aminotriazine type that require no additional curing accelerator of the admixed-catalyst type, or other curing reactant, in order to obtain technically useful products. Such aminoplasts may be termed "self-curing aminoplasts". It was quite surprising and unexpected to find that amphoteric amino acids, which are neutral substances, could be intercondensed with aminotriazines and active methylene-containing bodies thereby to impart accelerated curing characteristics to the resultant partial condensation product, particularly in view of the fact that it has generally been believed heretofore that only acids or substances evolving acids at molding temperatures would accelerate the curing of a heat-curable aminoplast.

In the heat-convertible resinous condensation products of this invention the self-curing property of the product is imparted thereto by creating a resin molecule having this inherent characteristic. This discovery makes possible the production of molding compositions of uniform curing characteristics, which compositions yield molded articles free from imperfections, such as blisters, discolorations, etc. Such imperfections are due mainly to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles that must be scrapped or sold at reduced price is of great commercial importance.

The resin syrups and molding compositions of this invention may be stored for long periods of time without material alteration. In marked contrast the prior heat-convertible aminoplasts obtained by reaction of an amino-triazine and an active methylene-containing body, more particularly those containing direct or active curing catalysts such as acids, for example hydrochloric, ethyl sulfuric, phthalic, chloracetic, phosphoric, etc., lacked time or storage stability. This necessitated early use of the material after incorporating the catalyst.

Furthermore, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the initial condensation reaction may be carried out at normal or at elevated temperatures, at atmospheric, sub-atmospheric or super-atmospheric pressure, in the presence or absence of a condensation catalyst and under alkaline, neutral or acid conditions. Preferably the reaction is started under neutral or alkaline conditions.

Neutral conditions may be established by neutralizing, if necessary, either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acetic conditions due to acid or acid salts. That is, the mass is neutralized or is made alkaline by adding an alkaline substance. The reaction then is caused to proceed further to produce the self-curing amino-plasts of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrocloric, sulfuric, phosphoric, acetic, acrylic, crotonic, malonic, etc, or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all the reactants and effect condensation between the mixed reactants in the presence or absence of addition agents, as for instance, condensation catalysts, fillers, plasticizers, or other natural or synthetic resinous bodies, solvents or diluents, etc. Thus the reaction may be carried out, if desired, in the absence of a solvent, or in an aqueous solvent, or in a non-aqueous solvent such as dioxane, ethyl alcohol, butyl alcohol, glycol monoacetate, ethylene glycol, diethylene glycol, glycerine, ethylene glycol monoalkyl ethers, etc.

Alternatively, I may add the amino acid (or a salt thereof) to a partial condensation product of an aminotriazine and an active methylene-containing body and effect further condensation between the components. In producing such a partial condensation product I prefer to cause the condensation reaction between the aminotriazine and the active methylene-containing body to take place in the presence of a primary condensation catalyst and a secondary condensation catalyst. The primary condensation catalyst advantageously is a member of the class consisting of (1) nitrogen-containing basic tertiary compounds that are aldehyde-non-reactable, e. g., tertiary amines such as trialkyl (e. g., trimethyl, triethyl, etc.) amines, triaryl (e. g., triphenyl, etc.) amines, etc., and (2) nitrogen-containing basic compounds that are aldehyde-reactable, for instance ammonia, primary amines (e. g., ethyl amine, propyl amine, etc.) and secondary amines (e. g., dipropyl amine, diethyl amine, etc.). The secondary condensation catalyst, which ordinarily is used in an amount less than the amount of primary catalyst, should be a fixed alkali, for instance a carbonate, cyanide or hydroxide of an alkali metal (e. g., sodium, potassium, lithium, etc.).

Another method of effecting reaction between the ingredients comprises first partially condensing the amino acid (or a salt thereof) with the active methylene-containing body, adding the resulting partial condensation product to a partial condensation product of an aminotriazine and an active methylene-containing body and then causing the reaction to proceed further. Or, I may condense or partly condense an amino acid or a salt thereof with a mol excess of an active methylene-containing body, add an aminotriazine to this condensation product and effect further reaction between the components.

Instead of using a single amino acid or a single salt of an amino acid I may, if desired, use a plurality of different amino acids or of different salts of amino acids. Mixtures of one or more amino acids and one or more salts of amino acids may be caused to react with an aminotriazine and an active methylene-containing body as above described. Particularly good results are obtained when an amphoteric amino acid and a basic salt of such an acid, in molar ratios to each other adjusted to give a predetermined pH as described more fully in my copending application Serial No. 256,998, are caused to react with an aminotriazine and an active methylene-containing body.

Still other ways may be employed in combining the components and in producing the unmodified and modified condensation products of this invention, as will be readily understood by those skilled in the art as the description of the invention proceeds.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified and unmodified resinous masses are self-convertible under heat or under heat and pressure to the insoluble, infusible state.

Depending upon the particular reactants employed and the particular conditions of reaction, these intermediate condensation products vary from clear, colorless, syrupy, water-soluble liquids to viscous milky dispersions and gel-like masses of decreased solubility in ordinary solvents such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface-coating materials, in the production of paints, varnishes, lacquers, enamels, etc., for general adhesive applications, in producing laminated articles and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration. All parts are by weight.

*Example 1*

| | Parts |
|---|---|
| Melamine | 630.0 |
| Aqueous solution of formaldehyde (approx. 37.1% HCHO) | 1400.0 |
| Aqueous ammonia (28% $NH_3$) | 30.0 |
| Sodium hydroxide in 150 parts water | 0.6 |
| Glycine | 1.0 |

All of the above components with the exception of the glycine were mixed and heated under reflux at the boiling temperature of the mass for 10 minutes. The stated amount of glycine was now added and the mixture was brought to boiling thereby to cause the glycine to intercondense with the melamine-formaldehyde partial condensation product. The hot resinous syrup was mixed with 670 parts alpha cellulose in flock form and 4 parts of a mold lubricant, specifically zinc stearate, to form a molding (moldable) compound. The wet compound was dried at 67° C. for 2 hours. The dried compound was molded for 2 minutes at 130° C. under a pressure of 2,000 pounds per square inch. The molded pieces could be pulled hot from the mold without distortion. They were well cured throughout and were very light-colored.

*Example 2*

| | Parts |
|---|---|
| Melamine | 315.0 |
| Urea | 150.0 |
| Aqueous solution of formaldehyde (approx. 37.1% HCHO) | 1000.0 |
| Aqueous ammonia (28% NH₃) | 30.0 |
| Sodium hydroxide in 30 parts water | 0.6 |
| Glycine | 0.95 |

The same procedure was followed in making the resin syrup as described under Example 1 with the exception that the time of initial heating of the reactants to form the urea-melamine-formaldehyde partial condensation product was 15 minutes. The hot resin syrup was mixed with 475 parts alpha cellulose and 4 parts zinc stearate to form a molding compound. The wet compound was dried at 63° C. for 2 hours and then at 75° C. for 1½ hours. The dried compound was molded for 2 minutes at 130° C. under a pressure of 2,000 pounds per square inch, yielding well-cured molded pieces that could be pulled hot from the mold without distortion.

*Example 3*

| | Parts |
|---|---|
| Melamine | 315.0 |
| Thiourea | 190.0 |
| Aqueous solution of formadehyde (approx. 37.1% HCHO) | 1000.0 |
| Aqueous ammonia (28% NH₃) | 30.0 |
| Sodium hydroxide in 30 parts water | 0.6 |
| Glycine | 0.98 |

The method of making the resin syrup was the same as in Example 1 with the exception that the initial heating period prior to adding the glycine was 15 minutes as in Example 2. A molding compound was made by mixing the hot resin syrup with 490 parts alpha cellulose and 4 parts zinc stearate, followed by drying the wet compound for 2½ hours at 70° C. The dried compound was molded at 130° C. under a pressure of 2,000 pounds per square inch, yielding well-cured molded pieces of good appearance and excellent resistance to water.

*Example 4*

| | Parts |
|---|---|
| Melamine | 472.5 |
| Dicyandiamide | 105.0 |
| Aqueous solution of formaldehyde (approx. 37.1% HCHO) | 1200.0 |
| Aqueous ammonia (28% NH₃) | 30.0 |
| Sodium hydroxide in 30 parts water | 0.6 |
| Glycerine | 2.04 |

All of the above components with the exception of the glycine were heated together under reflux at the boiling temperature of the mass for 15 minutes, after which the stated amount of glycine was added and the mass was brought to boiling temperature. The resulting hot syrup was mixed with 610 parts alpha cellulose and 4 parts zinc stearate to form a molding composition. The wet compound was dried at room temperature until sufficiently moisture-free for proper molding. The dried compound was molded at 140° C. for 5 minutes under a pressure of 2,000 pounds per square inch. The molded pieces were well cured throughout.

*Example 5*

| | Parts |
|---|---|
| Melamine | 1200.0 |
| Ethyl acetoacetate | 65.0 |
| Aqueous solution of formaldehyde (approx. 37.1% HCHO) | 2800.0 |
| Aqueous ammonia (28% NH₃) | 60.0 |
| Sodium hydroxide in 200 parts water | 1.6 |
| Glycine | 4.0 |

The same procedure was followed in making the resin syrup as described under Example 1. The hot resin syrup was mixed with 1330 parts alpha cellulose and 8 parts zinc stearate to form a molding compound. The wet compound was dried at 67° C. for 2½ hours. The dried compound was molded for 2 minutes at 130° C. under a pressure of 2,000 pounds per square inch. The molded pieces were well cured throughout and slightly yellow in color.

*Example 6*

| | Parts |
|---|---|
| Melamine | 1132.0 |
| Diethyl malonate | 216.0 |
| Aqueous solution of formaldehyde (approx. 37.1% HCHO) | 2800.0 |
| Aqueous ammonia (28% NH₃) | 60.0 |
| Sodium hydroxide in 120 parts water | 1.2 |
| Glycine | 4.0 |

The method of making the resin syrup was the same as in Example 1 with the exception that the initial heating period prior to adding the glycine was 15 minutes as in Example 2. A molding compound was made by mixing the hot resinous syrup with 1330 parts alpha cellulose and 8 parts zinc stearate, followed by drying the wet compound at 67° C. for 65 hours. The dried compound was molded for 2 minutes at 130° C. under a pressure of 2,000 pounds per square inch. The molded pieces could be pulled hot from the mold without distortion. They were well cured throughout and showed good plastic flow during molding.

*Example 7*

| | Parts |
|---|---|
| Melamine | 283.0 |
| Mixture of 21.5 parts monomethylol methyl ethyl ketone, 5.02 parts dimethylol methyl ethyl ketone and 20.8 parts water, total being | 47.32 |
| Aqueous solution of formaldehyde (approx. 37.% HCHO) | 700.0 |
| Aqueous ammonia (28% NH₃) | 15.0 |
| Sodium hydroxide in 25 parts water | 1.0 |
| Glycine | 1.9 |

The same procedure was followed in making the resin syrup as described under Example 1. The hot resin syrup was mixed with 360 parts alpha cellulose and 2.5 parts zinc stearate to form a molding compound. The wet compound was dried at 67° for 2½ hours. Molded articles were made from the dried compound by molding portions thereof for 2 minutes at 130° C. under a pressure of 2,000 pounds per square inch. The molded pieces could be removed hot from the mold without distortion. They were well cured throughout and had excellent water resistance.

It will be understood, of course by those skilled in the art that my invention is not limited to the specific components named in the above illustrative examples nor to the specific proportions therein given. Thus, instead of using melamine any other aminotriazine (amidogen triazine) containing at least one active hydrogen atom in the molecule, specifically in an amino radical thereof, may be employed. I prefer to use triazines containing either at least one unsubstituted amidogen (—NH₂) group or a plurality of partly substituted amidogen groups. Examples of such triazines which may be used in producing the new synthetic materials of this invention are ammeline, ammelide, formoguanamine, 2-amino-1,3,5-triazine and its substitution products; derivatives of melamine, e. g., 2,4,6-trihydrazino-1,3,5-triazine, melam, melon, 2,4,6-triethyltriamino -1,3,5 - triazine, 2,4,6 - triphenyltriamino-1,3,5-triazine, etc.; nuclearly substituted aminotriazines, e. g., 1-cyano-2-amino-4,6-dimethyl-1,3,5-triazine, 2-chloro-4,6-diamino-1,3,5-triazine, 6-methyl-2,4-diamino-1,3,5-triazine, 2-alkyl-4-amino-6-hydroxy-1,3,5-triazines (e. g., 2-methyl-4-amino-6-hydroxy-1,3,5-triazine, etc.), 2-aryl-4-amino-6-hydroxy-1,3,5-triazines (e. g., 2-phenyl-4-amino-6-hydroxy-1,3,5-triazine, etc.), 2-phenyl-p-oxy-4,6-diamino-1,3,5-triazine; poly-amino triazines wherein the hydrogen atoms of one or all of the amino groups are partially substituted by other amino groups, e. g., 2,4-diamino-6-hydrazino-1,3,5-triazine, 2-amino-4,6-dihydrazino-1,3,5-triazine, 2,4,6 - trihydrazino -1,3,5-triazine, etc.; poly-amino triazines wherein the hydrogen atoms of one or all of the amino groups are partially substituted by other monovalent substituents (e. g., alkyl, aryl, aralkyl, alkaryl, etc.), for instance 2-amino-4,6-diethylamino-1,3,5-triazine, 4-amino-2-methylamino - 6-chloro-1,3,5-triazine, 4-amino-2,6-diphenylamino-1,3,5-triazine, 2,4-diamino-6-phenylamino-1,3,5-triazine, symmetrical trialkyl and triaryl melamines; the amidogen 1,2,3-triazines and the amidogen 1,2,4-triazines, specifically the amino (—NH₂) and the carbamyl (—CONH₂) and the thiocarbamyl (—CSNH₂) 1,2,3- and 1,2,4-triazines. Additional examples of amidogen 1,3,5-triazines are given below:

2-carbamido-4,6-diamino-1,3,5-triazine
2,4-dicarbamido-6-amino-1,3,5-triazine
2,4,6-tricarbamido-1,3,5-triazine
2-thiocarbamido-4,6-diamino-1,3,5-triazine
2,4-dithiocarbamido-6-amino-1,3,5-triazine
2,4,6-trithiocarbamido-1,3,5-triazine
2-semicarbazido-4,6-diamino-1,3,5-triazine
2,4-di-(semicarbazido)-6-amino-1,3,5-triazine
2,4,6-tri-(semicarbazido)-1,3,5-triazine
2-(para-benzamido)-4,6-diamino-1,3,5-triazine
2,6-di-(para-benzamido)-4-amino-1,3,5-triazine
2,4,6-tri-(para-benzamido)-1,3,5-triazine
2-(ortho-phenylsulfamyl)-4,6-diamino-1,3,5-triazine
2,4-di-(ortho-phenylsulfamyl)-6-amino-1,3,5-triazine
2,4,6-tri-(ortho-phenylsulfamyl)-1,3,5-triazine
Meta-phenylsulfamyl and para-phenylsulfamyl derivatives of 1,3,5-triazines corresponding to the above ortho-phenylsulfamyl derivatives.

Other examples of amidogen triazines are the amidogen 1,2,3-triazines and 1,2,4-triazines corresponding to the above amidogen 1,3,5-triazines. The preferred class of triazines used in carrying the present invention into effect are the 2,4,6-amidogen-1,3,5-triazines.

As shown by certain of the examples a part of the aminotriazine may be replaced by urea, thiourea, dicyandiamide or other reactants. Illustrative examples of other reactants that may be substituted for a part of the aminotriazine are the alkyl ureas, selenoureas and thioureas (e. g., methyl, ethyl, etc., ureas, selenoureas and thioureas), aryl ureas, selenoureas and thioureas (e. g., phenyl urea, selenourea and thiourea, unsymmetrical diphenyl urea, selenourea and thiourea, etc.), alkyl aryl ureas, selenoureas and thioureas (e. g., unsymmetrical methyl phenyl urea, selenourea and thiourea, unsymmetrical ethyl phenyl urea, selenourea and thiourea, etc.), hydroxy ureas, selenoureas and thioureas, ethanol ureas, selenoureas and thioureas, acetyl urea, selenourea and thiourea, benzoyl urea, selenourea and thiourea, allyl urea, selenourea and thiourea, 2-chlorallyl urea, selenourea and thiourea, di-(phenylsulfamyl) ureas, selenoureas and thioureas, guanidine, biguanide, aminoguanidine, malonic diamide, maleic diamide, itaconic diamide, fumaric diamide, succinic diamide, citric triamide, phthalamide, etc.

In producing these new condensation products the choice of the active methylene-containing body is dependent largely upon economic considerations and upon the particular properties desired in the finished product. I prefer to use as the active methylene-containing body formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. Illustrative examples of other active methylene-containing bodies that may be employed are the mono- and poly-(N-carbinol) derivatives, more particularly the mono- and poly-methylol derivatives of urea, thiourea, selenourea and iminourea, and of substituted ureas, thioureas, selenoureas and iminoureas (numerous examples of which are given in the preceding paragraph), mono- and poly-(N-carbinol) derivatives of amides of polycarboxylic acids, e. g., maleic, itaconic, fumaric, malonic, succinic, citric, phthalic, etc., mono- and poly-(N-carbinol) derivatives of amidogen triazines such as those mentioned hereinbefore, etc. Particularly good results are obtained with active methylene-containing bodies such as mono- and di-methylol urea and the methylol melamines, e. g., mono-, di-, tri-, tetra-, penta- and hexa-methylol melamines. Mixtures of aldehydes and other active methylene-containing bodies may be employed, e. g., mixtures of formaldehyde and methylol compounds such, for instance, as di-methylol urea and trimethylol melamine.

The ratio of the reactants to each other may be considerably varied, but, in general, it is desirable to use at least one mol of an active methylene-containing body for each mol of mixed (total) aminotriazine and amino acid (or a salt thereof or a mixture of an amino acid and a salt thereof). In producing the heat-convertible resinous condensation products of this invention, the proportion of the amino acid and/or salt thereof in all cases is at least sufficient to impart self-curing characteristics to the resin. Ordinarily not exceeding substantially 0.3 mol of amino acid and/or salt thereof is used for each mol of aminotriazine. Preferred resinous compositions of this invention comprise the reaction product of ingredients comprising essentially the following components in the stated molar ratios: one mol of an aminotriazine, at least one mol of an active methylene-containing body and not exceeding substantially 0.3 mol of a mixture of an amino acid, e. g., glycine, and a basic salt thereof, e. g., an alkali-metal glycinate such as sodium glycinate, the molar ratios of the amino acid and the salt thereof with respect to each other being adjusted to give a predetermined pH. The salt of the amino acid may be separately prepared and incorporated into the reaction mass; or it may be formed in situ by adding to the reaction mixture an amino acid and a base in proportions necessary to form the desired amount of basic amino salt. Similarly, an acidic amino salt can be produced in situ by adding to the reaction mass an amino acid and an organic or inorganic acid in the proportions required to yield the desired amount of acidic amino salt.

The ratio of the active methylene-containing body, e. g., an aldehyde, to the aminotriazine may be varied over a wide range, but ordinarily the reactants are employed in an amount corresponding to from 1½ to 3¼ mols of aldehyde, specifically formaldehyde, for each mol of aminotriazine. When the aldehyde is available for reaction with the other reactants in the form of an alkylol derivative, more particularly a methylol derivative such, for instance, as dimethylol urea, trimethylol melamine, etc., then higher amounts of such active methylene-containing bodies are used, for example from 3½ to 10 or more mols of such alkylol derivatives for each mol of the aminotriazine. Taking melamine (an aminotriazine containing three unsubstituted amidogen groups) as illustrative of the aminotriazine, particularly good results are obtained with approximately three mols aldehyde, e. g., formaldehyde, for each mol melamine. If the aminotriazine contains only two unsubstituted amidogen groups (or one unsubstituted and two partly substituted amidogen groups), then one advantageously may use approximately two mols aldehyde for each mol of an aminotriazine. If the aminotriazine contains only one unsubstituted amidogen group (or two partly substituted amidogen groups), then no particular advantage usually accrues from using much in excess of one mol aldehyde for each mol of such an aminotriazine.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, acetamide, stearamide, acryloamide, benzamides, toluene sulfonamides, benzene disulfonamides, benzene trisulfonamides, adipic diamide, phthalamide, etc.; amines such as ethylene diamine, aniline, phenylene diamine, etc.; phenols; aminophenols; ketones; nitriles, e. g., acrylonitrile, methacrylonitrile, succinonitrile, etc.; and others.

The modifying bodies also may take the form of high molecular weight bodies with or without resinous characteristics, for example hydrolyzed wood products, formalized cellulose derivatives, lignin, protein-aldehyde condensation products, aminodiazine- and aminodiazole-aldehyde condensation products, phenol-aldehyde condensation products, urea-aldehyde condensation products, aniline-aldehyde condensation products, furfural condensation products, modified or unmodified, saturated or unsaturated polyhydric alcohol-polybasic acid condensation products, sulfonamide-aldehyde resins, water-soluble cellulose derivatives, natural gums and resins such as shellac, rosin, etc.; polyvinyl compounds such as polyvinyl alcohol, polyvinyl acetate, polyvinyl acetals, specifically polyvinyl formal, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a variety of shapes under heat and pressure, more particularly at temperatures of the order of 100° to 200° C., preferably from 120° to 180° C. Molding pressures may be varied considerably, but usually are within the range of 1,000 to 10,000 pounds per square inch, more particularly from 2,000 to 4,000 or 5,000 pounds per square inch.

From the foregoing description it will be seen that the present invention provides new and useful compositions of matter comprising a condensation product (in heat-curable or heat-cured state) of ingredients comprising essentially an aminotriazine (amidogen triazine), e. g., melamine, an active methylene-containing body (e. g., formaldehyde, dimethylol urea, etc.) and an amino compound selected from the class consisting of amphoteric amino acids (e. g., amphoteric amino carboxylic acids, amphoteric amino sulfonic acids, etc.), salts thereof and mixtures of amphoteric amino acids and salts thereof. The scope of the invention also includes method features for the production of such condensation products. For instance, one method feature of the invention comprises effecting partial reaction between ingredients comprising an aminotriazine, specifically melamine and an active methylene-containing body (or ingredients comprising a urea, specifically $NH_2CONH_2$, an aminotriazine and an active methylene-containing body), in the presence of an alkaline condensation catalyst, specifically a condensation catalyst comprising ammonia and a fixed alkali, adding a small amount of an amphoteric amino acid, specifically glycine, to the resulting partial condensation product and causing the amphoteric amino acid to intercondense with the said partial condensation product. Other method features of the invention include, for example, the method which comprises reacting the reaction product of formaldehyde and a salt of sulfamic acid, e. g., calcium sulfamate, with an aminotriazine, e. g., melamine, the said reaction being effected by the application of heat; the method which comprises bringing into contact at reaction temperature an aminotriazine, specifically melamine, and a formaldehyde derivative of a sulfamic acid salt, specifically calcium sulfamate, the said derivative having been prepared by reacting formaldehyde with said salt under alkaline conditions; the method which comprises bringing into contact at reaction temperature ingredients including melamine or other aminotriazine, formaldehyde and a sulfamate, e. g., a sulfamate of an alkaline-earth metal; the method which comprises effecting reaction under heat between ingredients including (1) an aminotriazine, e. g., melamine, and (2) the product of reaction, under alkaline conditions, of formaldehyde and a sulfamate, specifically a sulfamate of an alkaline-earth metal as, for instance, calcium sulfamate, and the products obtained by practicing such methods. My invention also provides thermosetting (heat-hardenable) molding compositions comprising a filler, e. g., a cellulosic filler, and a heat-curable condensation product of this invention, e. g., a heat-hardenable (heat-curable) condensation product of ingredients comprising melamine (or urea and melamine), formaldehyde or compounds engendering formaldehyde and an amino compound of the class herein described, e. g., glycine, an alkali-metal salt of glycine such, for instance, as sodium glycinate, or a mixture of glycine and an alkali-metal salt of glycine, the mol ratio of glycine and the alkali-metal salt of glycine with respect to each other preferably being adjusted to give a predetermined pH. The scope of the invention also includes molded articles of manufacture comprising the heat-set molding compositions.

The modified and unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the production of wire or baking enamels, for bonding or cementing together mica flakes to form a laminated mica article, for bonding together abrasive grains in the production of resin-bonded abrasive articles such, for instance, as grindstone, sandpapers, especially those intended for wet-sanding operations, in the manufacture of electrical resistors, etc. They also may be used as fire retardants and sizings, for instance in the treatment of cotton, linen and other cellulosic materials. They also may be used as impregnants for electrical coils. The cured resinous products have a high dielectric strength and outstanding resistance to heat, moisture and arcing. Hence they are especially adapted for use in electrically insulating applications wherein solid insulation possessing these characteristics is particularly desirable.

What I claim as new and desire to secure by Letters Patent of the United States is:

1. A composition of matter comprising the condensation product of ingredients comprising an aminotriazine, an active methylene-containing body and an amino compound selected from the class consisting of (1) amphoteric amino carboxylic acids and amphoteric amino sulfonic acids, (2) salts of the acids of (1), and (3) mixtures of (a) the acids of (1) with (b) salts of the acids of (1).

2. A composition of matter comprising an alcohol-modified condensation product of ingredients comprising an aminotriazine, an active methylene-containing body and an amino compound selected from the class consisting of (1) amphoteric amino carboxylic acids and amphoteric amino sulfonic acids, (2) salts of the acids of (1), and (3) mixtures of (a) the acids of (1) with (b) salts of the acids of (1).

3. A composition as in claim 1 wherein the active methylene-containing body is formaldehyde.

4. A composition as in claim 1 wherein the aminotriazine is melamine.

5. A heat-curable resinous condensation product of ingredients comprising an aminotriazine, formaldehyde and an amino compound selected from the class consisting of (1) amphoteric amino carboxylic acids and amphoteric amino sulfonic acids, (2) salts of the acids of (1), and (3) mixtures of (a) the acids of (1) with (b) salts of the acids of (1).

6. A product comprising the heat-cured resinous condensation product of claim 5.

7. A heat-curable resinous composition comprising a soluble, fusible condensation product of ingredients comprising the following components in the stated molar ratios: 1 mol of an aminotriazine, from 1½ to 3¼ mols formaldehyde and not exceeding substantially 0.3 mol of an amino compound selected from the class consisting of (1) amphoteric amino carboxylic acids and amphoteric amino sulfonic acids, (2) salts of the acids of (1), and (3) mixtures of (a) the acids of (1) with (b) salts of the acids of (1).

8. A product comprising the cured resinous composition of claim 7.

9. A composition comprising the reaction product of ingredients comprising an aminotriazine, an active methylene-containing body and an amphoteric amino carboxylic acid.

10. A composition comprising the reaction product of ingredients comprising an aminotriazine, an active methylene-containing body and an amphoteric amino sulfonic acid.

11. A heat-curable resinous condensation product of ingredients comprising urea, melamine, formaldehyde and glycine.

12. A product comprising the heat-cured resinous condensation product of claim 11.

13. A composition comprising the product of reaction of (1) a partial condensation product obtained by reaction, while admixed with an alkaline substance, of ingredients comprising an aminotriazine and formaldehyde and (2) an amino compound selected from the class consisting of (1) amphoteric amino carboxylic acids and amphoteric amino sulfonic acids, (2) salts of the acids of (1), and (3) mixtures of (a) the acids of (1) with (b) salts of the acids of (1).

14. A composition comprising the product of reaction of ingredients comprising melamine, formaldehyde, glycine and an alkali-metal salt of glycine, the mol ratio of glycine and the alkali-metal salt of glycine with respect to each other being adjusted to give a predetermined pH.

15. A thermosetting molding composition comprising a filler and a heat-hardenable condensation product of ingredients comprising an aminotriazine, formaldehyde and an amino compound selected from the class consisting of (1) amphoteric amino carboxylic acids and amphoteric amino sulfonic acids, (2) salts of the acids of (1), and (3) mixtures of (a) the acids of (1) with (b) salts of the acids of (1).

16. A product comprising the heat-hardened molding composition of claim 15.

17. The method of preparing new condensation products which comprises effecting reaction between ingredients comprising essentially an aminotriazine, an active methylene-containing body and an amino compound selected from the class consisting of (1) amphoteric amino carboxylic acids and amphoteric amino sulfonic acids, (2) salts of the acids of (1), and (3) mixtures of (a) the acids of (1) with (b) salts of the acids of (1).

18. The method which comprises effecting partial reaction between ingredients comprising melamine, urea and formaldehyde in the presence of a condensation catalyst comprising ammonia and a fixed alkali, adding a small amount of glycine to the resulting partial condensation product and causing the glycine to intercondense with the said partial condensation product.

19. A composition of matter comprising the condensation product of an aminotriazine, formaldehyde and glycine.

20. A composition of matter comprising the condensation product of melamine, formaldehyde, glycine and a salt of glycine.

21. A resinous composition obtained by reaction of ingredients comprising an aminotriazine, formaldehyde and glycine, said reaction being effected while the said components are admixed with an alkaline substance.

22. A composition comprising the resinous product of reaction of a small amount of glycine with a partial condensation product obtained by reaction of ingredients comprising melamine and formaldehyde while admixed with a small amount of a condensation catalyst comprising ammonia and a fixed alkali.

23. The method which comprises reacting the reaction product of formaldehyde and a salt of sulfamic acid with melamine, said reaction being effected by the application of heat.

24. The method which comprises reacting the reaction product of formaldehyde and calcium sulfamate with melamine, said reaction being effected by the application of heat.

25. The product produced by reacting melamine with the reaction product of formaldehyde and calcium sulfamate, said reaction being effected by the application of heat.

26. The method which comprises bringing into contact at reaction temperature melamine and a formaldehyde derivative of a sulfamic acid salt, said derivative having been prepared by reacting formaldehyde with said salt under alkaline conditions.

27. The method which comprises bringing into contact at reaction temperature melamine and a formaldehyde derivative of calcium sulfamate, said derivative having been prepared by reacting formaldehyde with said sulfamate under alkaline conditions.

28. The method which comprises bringing into contact at reaction temperature ingredients including melamine, formaldehyde and a sulfamate of an alkaline-earth metal.

29. The product obtained by effecting reaction under heat between ingredients including (1) melamine and (2) the reaction product of formaldehyde and a sulfamate.

30. The method which comprises effecting reaction under heat between ingredients including (1) melamine and (2) the product of reaction, under alkaline conditions, of formaldehyde and a sulfamate of an alkaline-earth metal.

31. The product obtained by effecting reaction under heat between ingredients including (1) melamine and (2) the product of reaction, under alkaline conditions, of formaldehyde and a sulfamate of an alkaline-earth metal.

GAETANO F. D'ALELIO.

---

CERTIFICATE OF CORRECTION.

Patent No. 2,377,868. June 12, 1945.

GAETANO F. D'ALELIO.

It is hereby certified that error appears in the printed specification of the above numbered patent requiring correction as follows: Page 1, second column, line 44, for "alkoylol" read --alkylol--; line 52, for "derivaive" read --derivative--; page 3, first column, line 12, for "acetic" read --acidic--; line 25, for "hydrocloric" read --hydrochloric--; page 4, first column, line 71, for "Glycerine" read --Glycine--; and second column, line 62, for "37.%" read --37.1%--; page 5, first column, line 4, after "course" insert a comma; page 6, first column, line 66, for "acryloamide" read --acrylamide--; page 7, first column, line 45, for "grindstone" read --grindstones--; and that the said Letters Patent should be read with this correction therein that the same may conform to the record of the case in the Patent Office.

Signed and sealed this 9th day of October, A. D. 1945.

Leslie Frazer (Seal) First Assistant Commissioner of Patents.

class consisting of (1) amphoteric amino carboxylic acids and amphoteric amino sulfonic acids, (2) salts of the acids of (1), and (3) mixtures of (a) the acids of (1) with (b) salts of the acids of (1).

18. The method which comprises effecting partial reaction between ingredients comprising melamine, urea and formaldehyde in the presence of a condensation catalyst comprising ammonia and a fixed alkali, adding a small amount of glycine to the resulting partial condensation product and causing the glycine to intercondense with the said partial condensation product.

19. A composition of matter comprising the condensation product of an aminotriazine, formaldehyde and glycine.

20. A composition of matter comprising the condensation product of melamine, formaldehyde, glycine and a salt of glycine.

21. A resinous composition obtained by reaction of ingredients comprising an aminotriazine, formaldehyde and glycine, said reaction being effected while the said components are admixed with an alkaline substance.

22. A composition comprising the resinous product of reaction of a small amount of glycine with a partial condensation product obtained by reaction of ingredients comprising melamine and formaldehyde while admixed with a small amount of a condensation catalyst comprising ammonia and a fixed alkali.

23. The method which comprises reacting the reaction product of formaldehyde and a salt of sulfamic acid with melamine, said reaction being effected by the application of heat.

24. The method which comprises reacting the reaction product of formaldehyde and calcium sulfamate with melamine, said reaction being effected by the application of heat.

25. The product produced by reacting melamine with the reaction product of formaldehyde and calcium sulfamate, said reaction being effected by the application of heat.

26. The method which comprises bringing into contact at reaction temperature melamine and a formaldehyde derivative of a sulfamic acid salt, said derivative having been prepared by reacting formaldehyde with said salt under alkaline conditions.

27. The method which comprises bringing into contact at reaction temperature melamine and a formaldehyde derivative of calcium sulfamate, said derivative having been prepared by reacting formaldehyde with said sulfamate under alkaline conditions.

28. The method which comprises bringing into contact at reaction temperature ingredients including melamine, formaldehyde and a sulfamate of an alkaline-earth metal.

29. The product obtained by effecting reaction under heat between ingredients including (1) melamine and (2) the reaction product of formaldehyde and a sulfamate.

30. The method which comprises effecting reaction under heat between ingredients including (1) melamine and (2) the product of reaction, under alkaline conditions, of formaldehyde and a sulfamate of an alkaline-earth metal.

31. The product obtained by effecting reaction under heat between ingredients including (1) melamine and (2) the product of reaction, under alkaline conditions, of formaldehyde and a sulfamate of an alkaline-earth metal.

GAETANO F. D'ALELIO.

CERTIFICATE OF CORRECTION.

Patent No. 2,377,868.  June 12, 1945.

GAETANO F. D'ALELIO.

It is hereby certified that error appears in the printed specification of the above numbered patent requiring correction as follows: Page 1, second column, line 44, for "alkoylol" read --alkylol--; line 52, for "derivaive" read --derivative--; page 3, first column, line 12, for "acetic" read --acidic--; line 25, for "hydrocloric" read --hydrochloric--; page 4, first column, line 71, for "Glycerine" read --Glycine--; and second column, line 62, for "37.%" read --37.1%--; page 5, first column, line 4, after "course" insert a comma; page 6, first column, line 66, for "acryloamide" read --acrylamide--; page 7, first column, line 45, for "grindstone" read --grindstones--; and that the said Letters Patent should be read with this correction therein that the same may conform to the record of the case in the Patent Office.

Signed and sealed this 9th day of October, A. D. 1945.

Leslie Frazer (Seal)  First Assistant Commissioner of Patents.